United States Patent [19]

Meyer et al.

[11] Patent Number: 4,600,752

[45] Date of Patent: Jul. 15, 1986

[54] EASY-FLOWING IMPACT-RESISTANT POLYAMIDE MODIFIED WITH OXYCARBONYL ISOCYANATE

[75] Inventors: Rolf-Volker Meyer; Rolf Dhein; Bert Brassat, all of Krefeld; Hermann Hagemann, Cologne, all of Fed. Rep. of Germany

[73] Assignee: Bayer Aktiengesellschaft, Leverkusen, Fed. Rep. of Germany

[21] Appl. No.: 711,675

[22] Filed: Mar. 14, 1985

Related U.S. Application Data

[63] Continuation of Ser. No. 275,041, Jun. 18, 1981, abandoned.

[30] Foreign Application Priority Data

Jun. 26, 1980 [DE] Fed. Rep. of Germany ....... 3023918

[51] Int. Cl.$^4$ ............................................. C08G 69/46
[52] U.S. Cl. ................................. 525/424; 524/196; 524/199
[58] Field of Search ................. 525/424; 524/196, 199

[56] References Cited

U.S. PATENT DOCUMENTS

| | | | |
|---|---|---|---|
| 3,306,875 | 2/1967 | Korshak et al. | 528/215 |
| 3,668,171 | 6/1972 | Sims | 524/196 |
| 3,692,813 | 9/1972 | Hagemann et al. | 524/196 |
| 3,706,778 | 12/1972 | Hagemann | 260/455 R |

Primary Examiner—Harold D. Anderson
Attorney, Agent, or Firm—Connolly and Hutz

[57] ABSTRACT

Easy-flowing impact resistant polyamides are obtained by incorporating (poly)oxycarbonylisocyanates into the polyamides.

6 Claims, No Drawings

EASY-FLOWING IMPACT-RESISTANT POLYAMIDE MODIFIED WITH OXYCARBONYL ISOCYANATE

This is a continuation of copending application Ser. No. 275,041 filed June 18, 1981, now abandoned.

This invention relates to easy-flowing, impact-resistant polyamides which are obtained by modifying polyamides with oxycarbonyl isocyanates.

The impact strength of moulded articles produced from polyamide plastics materials depends to a great extent on the water content of the moulded articles. In an anhydrous condition, e.g. after the production of the moulded articles by injection moulding, the moulded articles produced from easy-flowing polyamide materials having an intemediate molecular weight, especially from highly-crystalline polyamides are relatively sensitive to an impact strain.

Moulded articles from higher-molecular-weight polyamides, preferably used for extrusion processing, are less impact-sensitive, but are more difficult to be processed owing to the greatly increased melt viscosity and to the poorer flowability of the polyamide.

Moreover, the production of polyamides with higher viscosity usually requires an expensive secondary condensation step in solid phase.

Therefore, there is a demand for thermoplastic, quick processable, easy-flowing polyamides, from which moulded articles with good impact strength can be produced. Those polyamides are particularly of interest which exhibit a high tensile strength, a high heat stability, a good resistance to solvents and easy processibility combined with a high impact strength and flexibility.

Various processes for increasing the strength and flexibility of polyamides are already known. Thus, for example, low-molecular-weight plasticizers are added to polyamides but, for various reasons, this does not provide a satisfactory solution to the problem. Most of the plasticizers are not sufficiently compatible with polyamides and tend to segregate during processing or to exude. However, compatible plasticizers being dispersed in the polyamides mostly impair the mechanical properties of the polyamides. Strongly polar substances having a low molecular weight, such as water or dimethyl formamide, cause an improvement in strength, but are preferably incorporated into the moulded articles, because vesicular moulded articles would be produced when processing conditionated polyamide granulates due to the relatively low boiling point of water or dimethyl formamide.

For this reason, this method is generally too time-consuming and expensive and is unsuitable for the production of thick-walled moulded articles because of the irregular distribution of the additives in the moulded articles.

Attempts have also been made to branch or cross-link the polyamides in order to increase the strength and thus avoiding the solid phase secondary condensation step.

In principle, multifunctional epoxides and particularly multifunctional isocyanates are suitable, for example, for this purpose.

These processes may actually lead to products having an increased strength, but because the melt viscosity also increases to a considerable extent, processing the polyamides by injection moulding becomes very difficult.

Surprisingly, it has now been found that thermoplastic, impact-resistant and easy-flowing polyamides are obtained withtout the disadvantages mentioned when polyamides are modified with (poly)oxycarbonyl isocyanates. Moulded articles produced therefrom exhibit a clearly improved strength which may only be achieved for corresponding unmodified polyamides with a considerably higher molecular weight.

It is particularly surprising that, when modifying the polyamides in such way, the melt viscosity thereof does not increase; i.e. the good processability of the easy-flowing low and intermediate viscosity types is retained.

Therefore, the invention provides easy-flowing thermoplastic polyamides which are obtained by incorporating at least one oxycarbonyl isocyanate of the following general formula:

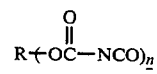

wherein n represents an integer from 1 to 4, preferably 2 or 3, and

R represents an n-functional organic radical.

R is preferably an optionally substituted and/or branched $C_1$–$C_{20}$, preferably C—C, aliphatic radical, a $C_7$–$C_{30}$, preferably araliphatic radical or a $C_6$–$C_{22}$, preferably C—C aromatic radical, a (poly)ether, (poly)ester, (poly)urethane or polyester(amide) radical, the polyradicals having an average molecular weight Mw of from 200 to 8000, preferably from 300 to 3000.

The (poly)oxycarbonyl isocyanates to be used according to the invention for modifying polyamides are known in principle. They may be produced, for example, according to German Auslegeschrift No. 1,793,088 by reacting chlorocarbonyl isocyanate with OH-terminated organic compounds of the R $(OH)_n$ type, wherein R and n are defined as above.

Examples of oxycarbonyl isocyanates of the R(O-CONCO)$_n$ type to be used according to the invention are products which are obtained by a reaction of optionally branched diols, such as the following, for example:
ethanediol-1,2
propanediol-1,3
butanediol-1,4
2,2-dimethyl-1,3-propanediol
hexanediol-1,6
octanediols
1,12-octadecanediol
1,4-bis-hydroxymethyl-cyclohexane
1,4-bis-(2-hydroxyethoxy)-benzene
2,2-bis-(4-hydroxyphenyl)-propane
2,2-bis-4-(2-hydroxyethoxy)-phenyl-propane
2,2-bis-(4-hydroxycyclohexyl)-propane
2,2-bis-4-(2-hydroxyethoxy)-cyclohexyl-propane, and
1,5-bis-(2-hydroxyethoxy)-naphthalene
and also triols, such as trimethylolpropane, with chlorocarbonyl isocyanate.

Oxycarbonyl isocyanates are preferably used wherein R is a polyether radical.

Such polyethers having at least two, usually from two to four, preferably two or three hydroxyl groups, are those of the type known per se and are produced, for example, by polymerization of epoxides such as ethylene oxide, propylene oxide, butylene oxide, styrene oxide or epichlorohydrin or tetrahydrofuran, e.g. in the presence of Lewis catalysts such as BF$_3$, or by adding these epoxides, preferably ethylene oxide and propylene oxide, optionally in admixture or successively, to starting components having reactive hydrogen atoms such as water, alcohols, preferably as stated above, ammonia or amines, e.g. ethylene glycol, propylene glycol-(1,3) or -(1,2), trimethylol propane, glycerine, sorbitol, 4,4'-dihydroxy-diphenyl propane, aniline, ethanolamine or ethylene diamine. Sucrose polyesters as described, for example, in German Auslegeschrift Nos. 1,176,358 and 1,0643,938, and polyethers started on formitol or formose (German Offenlegungsschrift Nos. 2,639,083 or 2,737,951), are also included according to the invention. Those polyethers are preferred which have predominantly (as much as 90% by weight, based on all OH-groups present in the polyether) primary OH-groups. Polyethers are particularly preferred which have a molecular weight Mw of from 200 to 6000, preferably from 400 to 2000, and are the reaction product of the above-mentioned polyols with ethylene oxide, propylene oxide and/or butylene oxide.

Oxycarbonyl isocyanates which are particularly preferably used are those wherein n=2 and R is a polyether radical produced of one mole of the aliphatic diols mentioned above with polyethylene oxide and/or polypropylene oxide and having a molecular weight Mw of from 400 to 2000.

Mixtures of the oxycarbonyl isocyanates may also be used; polyisocyanates of the R—(NCO)$_n$ type may be added too, as far as this is allowed by the flowability of the modified polyamides.

The modifier is used in quantities of from 0.5 to 15% by weight, preferably from 2 to 8% by weight, based on the polyamide.

The following may be used as polyamides within the context of the invention: linear polycondensates of lactams having from 6 to 12 carbon atoms in the ring or polycondensate from diamines and dicarboxylic acids, such as 6,6-, 6,7-, 6,8-, 6,9-, 6,10-, 6,12-, 8,8-, 12,12- polyamide, or polycondensates from aromatic dicarboxylic acids such as isophthalic acid or terephthalic acid with diamines such as hexamethylene diamine, octamethylene diamine, from araliphatic starting materials such as m- or p-xylylene diamines and adipic acid, suberic acid, sebacic acid, polycondensates based on alicyclic starting materials such as cyclohexane dicarboxylic acid, cyclohexane diacetic acid, diamino-dicyclohexylmethanes and isophorone diamine.

Mixtures of the polyamides mentioned or copolyamides obtainable from the monomers mentioned may also be used.

Partially crystalline polyamides are preferably used.

The relative viscosity of the polyamides to be used should be at least 1.8 (measured in a 1% solution in m-cresol at 25° C.).

The 6-, 6,6-, 6,9-, 6,10-, 6,12-, 11- and 12-polyamides which are usually used for commercial injection moulded articles can be particularly preferably modified and also copolyamides which are predominantly composed of the monomers of the above-mentioned polyamides and whose relative viscosity, measured as specified above, is in the range of from 2.5 to 4.0.

In order to produce the modified polyamides of the invention, the polyamide component and the (poly)oxycarbonyl isocyanate component are mixed together at a temperature above the melting point of the polyamide. This may be carried out directly after the production of the polyamide by mixing the (poly)oxycarbonyl isocyanate with the melt which is to be extruded as a strand.

The polyamides modified according to the invention are preferably produced by mixing the starting components in conventional screw machines.

In this process, machines provided with a single screw as well as those provided with double screws are suitable. Double screw extruders are preferably used, although any other mixing apparatus may also be used which is suitable for melting plastics materials.

Stabilisers, mould-release agents, lubricants, crystallisation accelerators, softeners, pigments, dyes, reinforcing materials and/or fillers, such as glass fibres or asbestos, may also be incorporated in the polyamides, theses additives preferably being incorporated simulataneously with the incorporation of the modifier.

The polyamides modified according to the invention are particularly easy-flowing products which may be readily processed into the moulded article in commercially used injection moulding machines, and the moulded articles exhibit a clearly improved notched impact strength compared to unmodified comparative products while retaining the good mechanical properties typical for polyamides.

Moulded articles produced from the moulding composition of the invention may be released from the mould without other additives in an improved manner compared to unmodified comparative products and are distinguished by a very desirable surface structure.

EXAMPLE 1

98 parts by weight of polyamide-6, having a relative viscosity of 3.0, measured in a 1% solution in m-cresol at 25° C., a notched impact strength determined according to DIN 53 453 of 2.1 kJ/m$^2$ and a flow length* of 52 cm, and 2 parts by weight of a bis-(oxycarbonyl isocyanate) (yellowish, medium viscosity oil having an NCO content of 4%) produced from chlorocarbonyl isocyanate and a polypropylene oxide-polyether having an average molecular weight Mw of 2000 ("Desmophen 3600 ®" of Bayer A.G.) are introduced separately into a double shaft extruder of the ZSK 53 type using a metering balance or metering pump and are extruded at 260° C. and at 90 r.p.m. The homogeneous melt is spun off into a water bath in the form of strands, is granulated and then dried to a water content of <0.05% by weight under vacuum at 80° C.

The product has a relative viscosity of 3.1, a notched impact strength of 5.4 kJ/m$^2$ and a flow length of 53 cm*; i.e. the flowability, as a measure of the processibility, is practically unchanged despite the comparable molecular weight and the clearly increased notched impact strength.

*The flow length is a measure of the flowability of a product and is thereby a measure of its processibility; a longer flow length means an improved flowability and thereby shorter injection cycles. The flow length was determined as follows: the sample to be tested was injected at an injection pressure of 72 bars, into a specific tool which was maintained at 90°, using an injection moulding machine, whose cylinder temperature was 260° C. Particularly easy-flowing materials are capable of filling the tool under these conditions, so that a spiral which is 100 cm long may subsequently be removed. Less flowable materials only partly fill the tool under the conditions described; spiral bodies which are only <100 cm long may then be obtained due to the premature solidification of the melt. The length in cm which was reproduced 5 times is given as the flow length.

A polyamide-6 produced in a conventional manner by direct condensation or by solid phase secondary condensation step which has a comparable notched impact strength has a flow length of only 30 cm.

EXAMPLES 2 to 8

The method described in Example 1 was repeated, the relative viscosity and chemical composition of the polyamide being varied.

The composition of the products and their properties are given in Table 1.

6,6-Polyamide was extruded at 275° C. (Example 4).

EXAMPLES 9 to 11

As described in Example 1, 6-polyamide having a relative viscosity of 2.9 is extruded and processed with various (poly)oxycarbonyl isocyanates.

The properties of the modified polyamides are set forth in Table 2.

TABLE 1

| Example | Type | Polyamide used η rel | Polyamide used parts by weight | Polyamide used $a_k^{(x)}$ (kJ/m²) | Flow length (cm) | Additive as in Ex. 1 (parts by weight) | Properties of the product η rel | Properties of the product $a_k$ (kJ/m²) | Properties of the product flow length (cm) |
|---|---|---|---|---|---|---|---|---|---|
| 2 | 6-PA | 2.9 | 95 | 2.1 | 50 | 5 | 2.8 | 8.7 | 77 |
| 3 | 6-PA | 2.4 | 97 | 1.4 | 80 | 3 | 2.4 | 3.9 | 100 |
| 4 | 6,6-PA | 3.0 | 97 | 2.5 | 65 | 3 | 3.0 | 5.2 | 67 |
| 5 | 6,9-PA | 3.5 | 97 | 3.9 | 45 | 3 | 3.8 | 7.6 | 50 |
| 6 | PA from hexamethylene diamine/isophthalic acid | 2.4 | 98 | 2.8 | 28 | 2 | 2.4 | 4.3 | 30 |
| 7 | copolyamide from 90% by weight of ε-caprolactam and 10% by weight of hexamethylene diamine/azelaic acid | 3.2 | 97 | 3.5 | 62 | 3 | 3.2 | 9.4 | 66 |
| 8 | copolyamide from 94% by weight of ε-caprolactam and 6% by weight of isophthalic acid/isophoronediamine | 3.6 | 97 | 3.0 | 35 | 3 | 3.5 | 9.0 | 38 |

$^{(x)}a_k$ = Notched impact strength (determined according to DIN 53 453)

TABLE 2

Modification of 6-polyamide ($\eta_{rel}$ = 2.9, flow length = 52 cm) with various bisoxycarbonyl isocyanate additives (total of parts by weight = 100)

| Example | Additive Type$^{(x)}$ | Additive Quantity (parts by weight) | Properties $\eta_{rel}$ | Properties Notched impact strength $a_k$ (kJ/m²) | Properties Flow length (cm) |
|---|---|---|---|---|---|
| 9 | I | 2 | 3.2 | 5.3 | 49 |
| 10 | II | 2 | 2.8 | 3.7 | 68 |
| 11 | III | 4 | 3.4 | 6.7 | 47 |
| Comparative Example: A | IV | 2 | 4.6 | 4.3 | 22 |
| Comparative Example: B | V | 1 | 4.4 | 3.9 | 27 |

$^{(x)}$I: Bisoxycarbonyl isocyanate from polyethylene glycol with a molecular weight of approx. 1500; almost colourless wax, softening range approx. 45° C., NCO content: 4.9%.
II: Bisoxycarbonyl isocyanate from 1,12-octadecanediol, colourless oil, NCO content: 19%
III: Mixture of 3 parts by weight of additive as in Example 1 and 1 part by weight of the allophanate-modified polyisocyanate IV
IV: Allophanate-modified polyisocyanate, based on hexamethylene diisocyanate and n-butanol, almost colourless, intermediate viscosity liquid, NCO content: 17.3%
V: Diphenyl methane diisocyanate with approx. 35% multifunctional multinuclear portions.

We claim:

1. A thermoplastic, easy-flowing polyamide selected from polylactam of a lactam having from 6 to 12 carbon atoms in the lactam ring, polycondensate of diamine and dicarboxylic acid or mixtures thereof modified by incorporating therein at least one oxycarbonyl isocyanate of the formula $$R(-O-\underset{\underset{O}{\|}}{C}-NCO)_n$$

wherein n is an integer of from 1 to 4 and R is an n-valent radical selected from the group consisting of $C_1-C_{20}$ aliphatic radicals, $C_7-C_{30}$ araliphatic radicals, $C_6-C_{22}$ aromatic radicals and radicals of the formula $$-(CH)_{\overline{m}}(-O(CH)_{\overline{m}})_{\overline{n}}-O(CH)_{\overline{m}}-$$
$$\quad\; R^1 \qquad\quad R^1 \qquad\quad R^1$$

wherein R' is independently hydrogen or a $C_1-C_4$ alkyl radical, m is an integer of from 2 to 4 and n' is an integer of from 1 to 200.

2. Polyamide as claimed in claim 1, wherein R represents a radical of the general formula:

$$-(CH)_m-(O(CH)_m)_{\overline{n}}-O(CH)_{\overline{m}}-$$
$$\;\; R' \qquad\quad R' \qquad\quad R'$$

wherein
each R' independently represents H or a $C_1-C_4$ alkyl radical,
m represents an integer from 2 to 4, and
n' represents an integer from 1 to 200.

3. Polyamide as claimed in claim 2, wherein
each R' represents a methyl radical, and
n represents an integer from 10 to 50.

4. Polyamide as claimed in claim 1 containing 0.5 to 15% by weight of the modifier.

5. Moulded article produced from polyamide as claimed in claim 1.

6. A thermoplastic, easy-flowing polyamide selected from polylactam of a lactam having from 6 to 12 carbon atoms in the lactam ring, polycondensate of diamine and dicarboxylic acid or mixtures thereof modified by incorporating therein at least one oxycarbonyl isocyanate of the formula

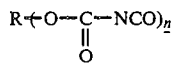
wherein R is a $C_1$–$C_{20}$ aliphatic radical, a $C_7$–$C_{30}$ araliphatic radical, a $C_6$–$C_{22}$ aromatic radical, or a (poly)-radical which is a (poly)ether, (poly)ester, (poly)urethane or polyester(amide) radical, each having an average molecular weight Mw of from 200 to 8000.
* * * * *